B. F. GRAVES.
MILKING MACHINE.
No. 75,261. Patented Mar. 10, 1868.
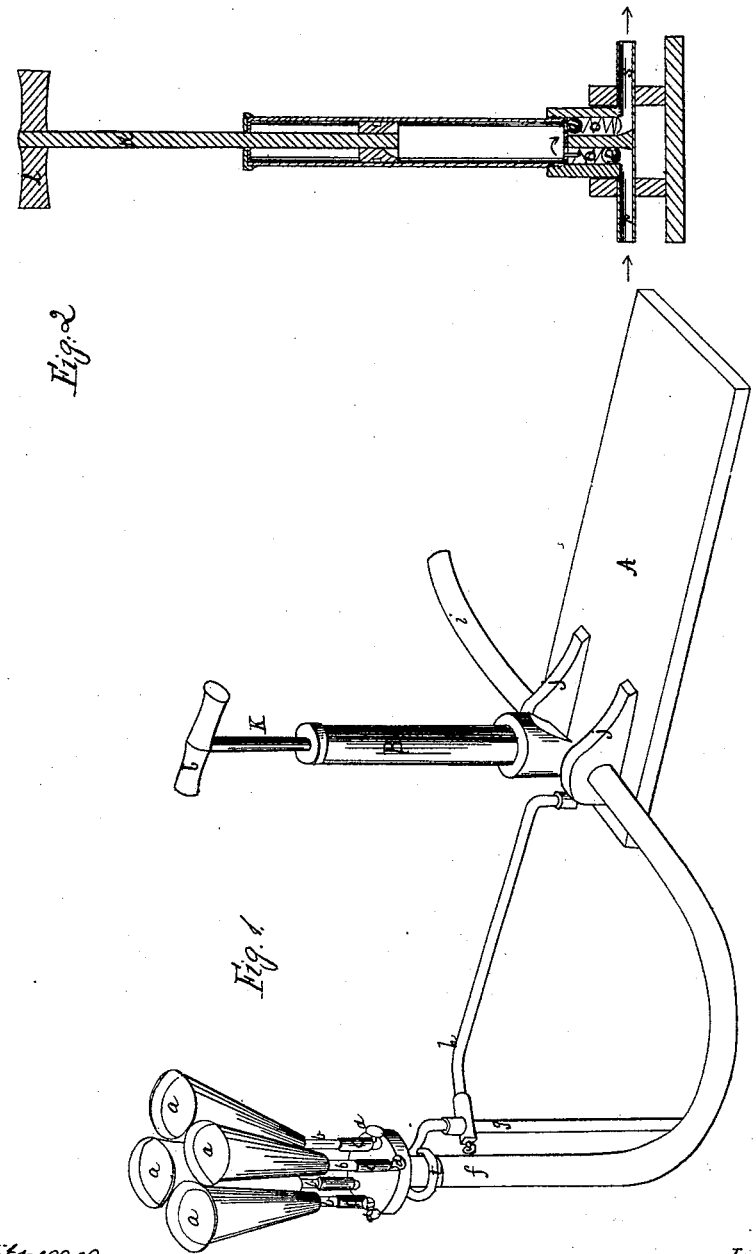

United States Patent Office.

BENJAMIN F. GRAVES, OF GROTON, MASSACHUSETTS.

Letters Patent No. 75,261, dated March 10, 1868.

IMPROVEMENT IN MILKING-MACHINE.

The Schedule referred to in these Letters Patent and making part of the same.

Be it known that I, BENJAMIN F. GRAVES, of Groton, in the county of Middlesex, and Commonwealth of Massachusetts, have invented a new and useful Machine for Milking Cows; and I do hereby declare that the following is a full, clear, and exact description of the construction and operation of the same, reference being had to the annexed drawings, making a part of this specification, in which—

Figure 1 is a perspective view of the entire machine.

Figure 2 is a longitudinal section of the pump, its piston and valves.

To enable others skilled in the art to make and use my invention, I will proceed to describe its principles, construction, and operation.

The nature of my invention consists in drawing milk from cows by means of a pump, connected by an elastic tube with elastic cups fitting upon the teats and udder of the cow, with transparent glass connections, through which the milk may be seen to flow, with stop-cocks, by which the machine may be made to draw from one or more teats at pleasure, and valves so arranged as to open and close alternately with the working of the pump, and thus milk the cow into the pail or other vessel.

A represents a wooden platform, to which are attached elastic tubes, $f\ i$, by means of the wooden brackets $j\ j$, into which the tubes enter and connect with a pump, B, by means of metallic pipes $r\ s$. Two ball-and-socket or other valves, $p\ q$, are so arranged at the bottom of the pump, being in the drawing shown to be held in position by spiral springs $o\ o$, that when the piston $m\ m$ is drawn outward the valve $p$ is opened, and the milk admitted into the pump, while the valve $q$ is closed; and when the piston is forced inward the valve $p$ is closed, and the valve $q$ opened, and the milk in the pump driven through it and the tube $i$ into the pail. $a\ a\ a\ a$ are cups of rubber or other elastic material to fit upon the teats of the cow, with flanges of the same, designed to press air-tight against the udder, the base of the cups being thick enough not to collapse, while the tops and flanges are sufficiently thin and elastic to press the teats and udder under the action of the pump, said cups and flanges, as thus constructed, being different from any heretofore invented. The cups $a\ a\ a\ a$ are connected by glass tubes, $b\ b\ b\ b$, with tubes of rubber or other material, $c\ c\ c\ c$, which again are connected with metallic tubes, which enter a metallic cylinder, $e$, which receives the milk, and from which it is drawn by the pump through the tube $f$ into the pump, as before described. At the base of each tube above the cylinder is a stopcock, $d$, which may be turned when the milk from any teat, as seen through the glass tube $b$, ceases to flow, and thus prevents drawing the teat unnecessarily, and making the cow restive. The metallic rod $h$, hinged to the platform A, so as to turn freely, sustains the teat-cups, by means of a ring at its top, at any desired height, by means of the rod $g$, to which it is secured by means of a thumb-screw or otherwise. The pump B is attached to the tubes $f\ i$, so that, by means of the twisting of said tubes or otherwise, it may be inclined at any desired angle. The pump may be so constructed as to have a rotary motion.

What I claim as my invention, and desire to secure by Letters Patent, is—

The arrangement of the pump, with the flexible tubes, teat-cups, glass tubes, stop-cocks, devices for adjusting the teat-cups to the udder of the cow, all constructed and arranged substantially as described and for the purposes specified.

BENJ. F. GRAVES.

Witnesses:
O. B. CHENEY,
HENRY S. FRENCH.